(12) United States Patent
Chang et al.

(10) Patent No.: US 12,221,365 B2
(45) Date of Patent: Feb. 11, 2025

(54) METHOD FOR CONCENTRATING AQUEOUS SOLUTION WITH LOW ENERGY BY USING REVERSE OSMOSIS AND FORWARD OSMOSIS IN STATE IN WHICH MULTIPLE-NO OSMOTIC PRESSURE DIFFERENCE IS INDUCED

(71) Applicant: SEEBIO INC., Seoul (KR)

(72) Inventors: Ho Nam Chang, Seoul (KR); Yoon Seok Chang, Seoul (KR); Nam Uook Kim, Gyeonggi-do (KR)

(73) Assignee: SEEBIO INC., Seoul (KR)

( * ) Notice: Subject to any disclaimer, the term of this patent is extended or adjusted under 35 U.S.C. 154(b) by 668 days.

(21) Appl. No.: 17/438,060

(22) PCT Filed: Mar. 16, 2020

(86) PCT No.: PCT/KR2020/003595
§ 371 (c)(1),
(2) Date: Sep. 10, 2021

(87) PCT Pub. No.: WO2020/189999
PCT Pub. Date: Sep. 24, 2020

(65) Prior Publication Data
US 2022/0204364 A1 Jun. 30, 2022

(30) Foreign Application Priority Data
Mar. 15, 2019 (KR) .................. 10-2019-0029757

(51) Int. Cl.
*C02F 1/44* (2023.01)
*B01D 61/00* (2006.01)
(Continued)

(52) U.S. Cl.
CPC ............ *C02F 1/445* (2013.01); *B01D 61/002* (2013.01); *B01D 61/025* (2013.01); *B01D 61/12* (2013.01);
(Continued)

(58) Field of Classification Search
CPC ...... C02F 1/445; C02F 1/441; C02F 2103/08; C02F 2209/03; C02F 2209/40;
(Continued)

(56) References Cited

U.S. PATENT DOCUMENTS 9,950,297 B2  4/2018  Chang et al.
2017/0349467 A1  12/2017  Blohm et al.
2018/0207584 A1*  7/2018  Chang .................. C02F 1/441

FOREIGN PATENT DOCUMENTS

JP  2009195871 A  9/2009
KR  1020140100431 A  8/2014
(Continued)

OTHER PUBLICATIONS

EESR issued on Oct. 19, 2022 in counterpart European Patent Application No. 20772996.3.
(Continued)

*Primary Examiner* — Terry K Cecil
(74) *Attorney, Agent, or Firm* — HULTQUIST, PLLC; Steven J. Hultquist

(57) ABSTRACT

The present invention relates to a method for concentrating, with low energy, a solute-containing solution in a state of multiple-no osmotic pressure difference (M(multiple)-$\Delta\pi=0$ RO), and, more specifically, to a method for concentrating, with low energy, an solute-containing solution intended to be concentrated, as a low pressure in a state of multiple-no osmotic pressure difference. The method for concentrating a solution containing a solute at a low pressure in a state of multiple-no osmotic pressure difference, of the present (Continued)

invention, consumes less energy, enables concentration to be performed until a saturated aqueous solution with a maximum solute concentration is obtained or the concentration of the solute becomes 100% even though an extraction solvent is not used, and does not require the use of an additional osmosis-inducing solution.

8 Claims, 11 Drawing Sheets

(51) Int. Cl.
  *B01D 61/02* (2006.01)
  *B01D 61/12* (2006.01)
  *B01D 61/58* (2006.01)
  *C02F 103/08* (2006.01)

(52) U.S. Cl.
  CPC .............. *B01D 61/58* (2013.01); *C02F 1/441* (2013.01); *B01D 2311/08* (2013.01); *B01D 2311/20* (2013.01); *B01D 2311/2523* (2022.08); *B01D 2317/08* (2013.01); *C02F 2103/08* (2013.01); *C02F 2209/03* (2013.01); *C02F 2209/40* (2013.01)

(58) Field of Classification Search
  CPC .... B01D 61/002; B01D 61/025; B01D 61/12; B01D 61/58; B01D 2311/08; B01D 2311/20; B01D 2311/2523; B01D 2317/08; B01D 2311/14; B01D 2311/25; B01D 61/0024
  See application file for complete search history.

(56) References Cited

FOREIGN PATENT DOCUMENTS

| KR | 1020150135593 | A | 12/2015 |
| KR | 1020170097967 | A | 8/2017 |
| KR | 101926057 | B1 | 11/2018 |
| KR | 101865342 | B1 | 5/2021 |
| WO | 2018190937 | A1 | 10/2018 |

OTHER PUBLICATIONS

Chang, H.N., et al., "Forward Osmotic Pressure-Free ($\Delta \pi \leq 0$) Reverse Osmosis and Osmotic Pressure Approximation of Concentrated NaCl Solutions", Membrane Journal, 2022, pp. 235-252, vol. 32, No. 4.

Chang, HN, et al., "Chang approximation for the osmotic pressure of dilute to concentrated solutions", Korean J. Chem. Eng., 2020, pp. 583-587; DOI:10.1007/s11814-018-0460-2, vol. 37, No. 4, Publisher: Rapid Communications.

Jung, K., et al., "Permeation characteristics of volatile fatty acids solution by forward osmosis", Process Biochemistry, 2015, pp. 669-677; http://doi.org/10.1016/j.procbio.2015.01.016, vol. 50, No. 4, Publisher: Elsevier.

Loeb, S., "Production Energy From Concentrated Brines by Pressure-Retarded Osmosis", Journal of Membrane Science, 1976, pp. 49-63, vol. 1, Publisher: Elsevier.

Loeb, S., "The Loeb-Sourirajan Membrane: How It Came About", ACS Symposium Series, 1981, pp. 1-9, vol. 153, No. 1, Publisher: American Chemical Society.

* cited by examiner

FIG. 3
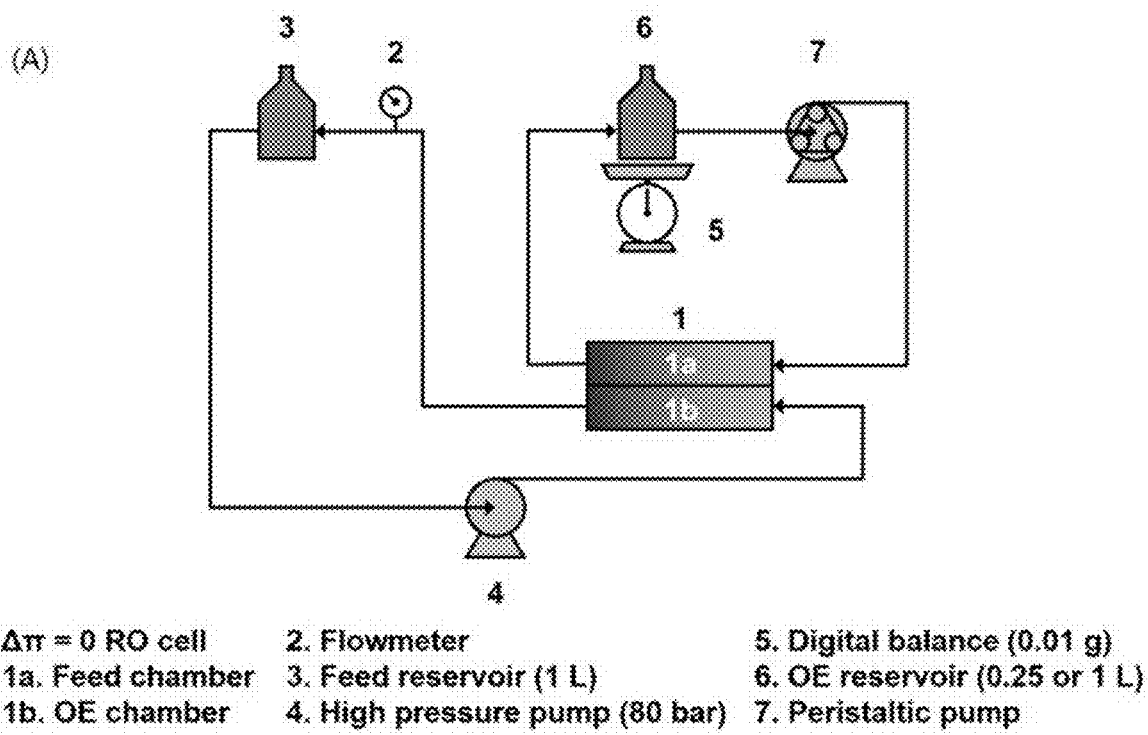
1. Δπ = 0 RO cell
   1a. Feed chamber
   1b. OE chamber
2. Flowmeter
3. Feed reservoir (1 L)
4. High pressure pump (80 bar)
5. Digital balance (0.01 g)
6. OE reservoir (0.25 or 1 L)
7. Peristaltic pump
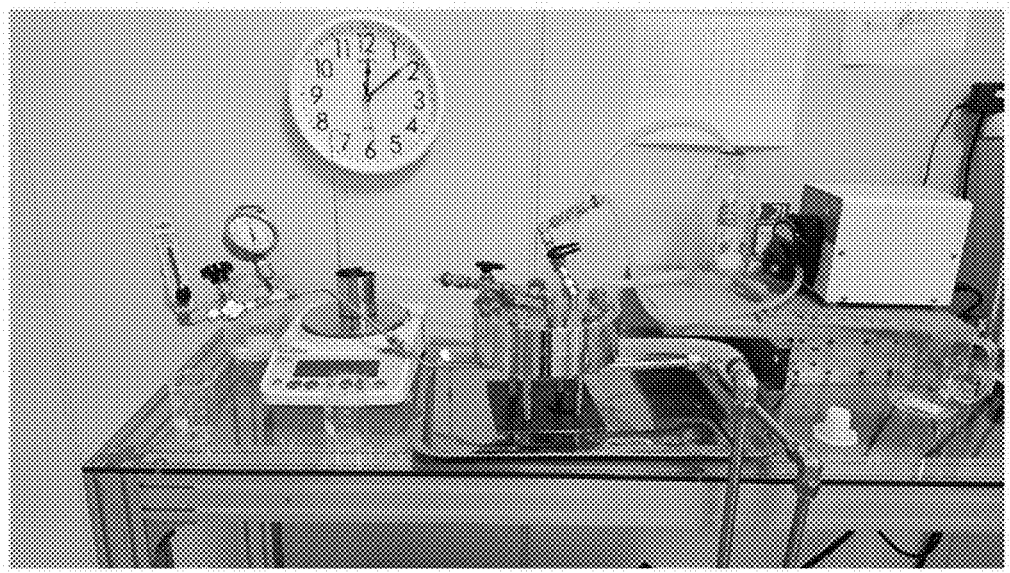

FIG. 7

| | Δπ-0 Reverse Osmosis : flux and residence time | | | 02.28-2020 | | | | |
|---|---|---|---|---|---|---|---|---|
| #EXP | | ΔP-Δπ | ΔP | Δπ | OE-velocit | x1 | x2 | x3 | π |
| 1 | 1% Δπ=0 | 40 | 40 | | Q-m/Θc | 0.468 | 0.721 | 1.093 | 7.609 |
| | | | | | RM | 1.000 | 1.558 | 2.296 | |
| 2 | 2% Δπ=0 | 40 | 40 | | | 0.159 | 0.215 | 0.579 | 15.518 |
| | | | | | | 1.000 | 1.347 | 3.634 | |
| 3 | 3% RO 7 | 16.258 | 40 | 23.742 | | 0.168 | 0.114 | 0.308 | |
| | | | | | | 1.000 | 0.682 | 1.839 | |
| 4 | 3% Δπ=0 | 40 | 40 | | | 0.121 | 0.272 | 0.695 | 23.742 |
| | | | | | | 1.000 | 2.251 | 5.756 | |
| 5 | 3-1.5% RO | 28.437 | 40 | 11.563 | | 0.096 | 0.234 | 0.695 | 23.742 |
| | | | | | | 1.000 | 0.412 | 7.213 | |
| 6 | 6-3% RO | 16.258 | 40 | 23.742 | | 0.050 | 0.017 | 0.093 | 50.467 |
| | | | | | | 1.000 | 0.335 | 1.878 | |
| 7 | 6% RO | 16.258 | 40 | 23.742 | | | | | 50.467 |
| 8 | 6% Δπ=0 | 70 | 70 | | | 0.194 | 0.417 | 0.802 | 50.647 |
| | | | | | | 1.000 | 2.152 | 4.134 | |
| 9 | 9-6% RO | -10.467 | 40 | 50.467 | | 0.022 | 0.046 | 0.073 | 80.61 |
| | | | | | | 1.000 | 2.052 | 3.240 | |
| 10 | 9% Δπ=0 | 70 | 70 | | | 0.041 | 0.204 | 0.550 | 80.601 |
| | | | | | | 1.000 | 4.985 | 13.435 | |
| 11 | 9-6% RO | 19.533 | 70 | 50.467 | | 0.007 | 0.203 | 1.916 | |
| | | | | | | 1.000 | 2.898 | 9.625 | |

Flow diagram of M-Δπ=0 RO system

FIG. 10
(A)
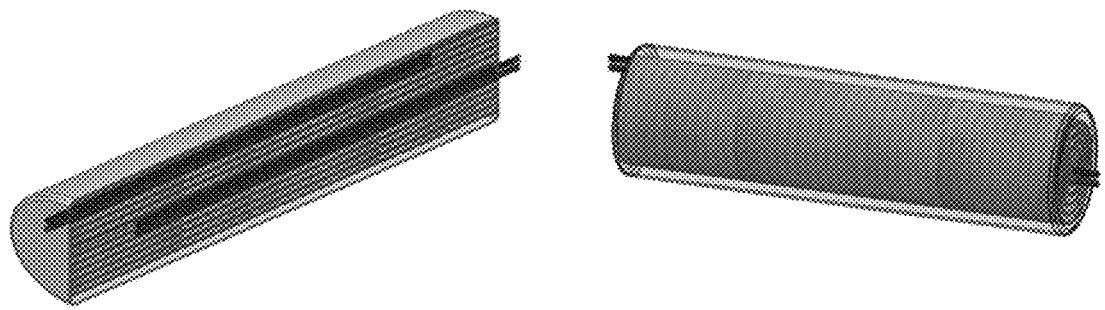
(B)
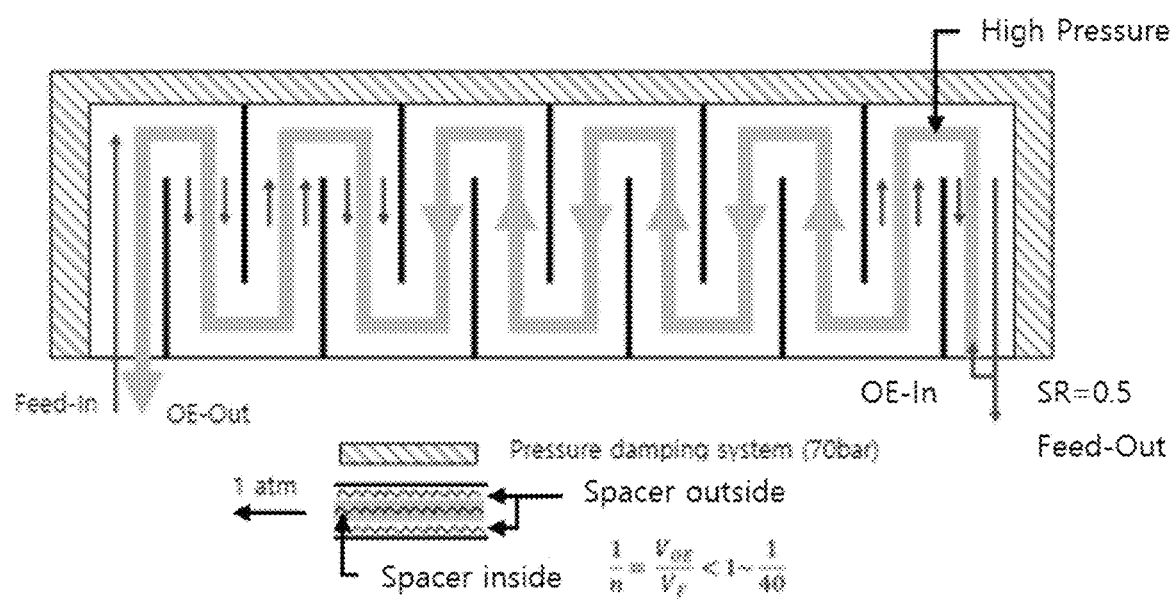

FIG. 11
(A)
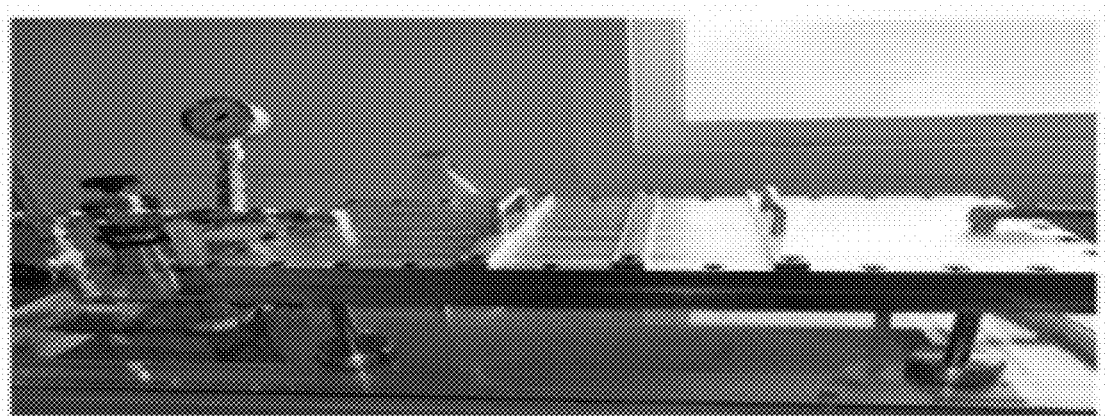
(B)
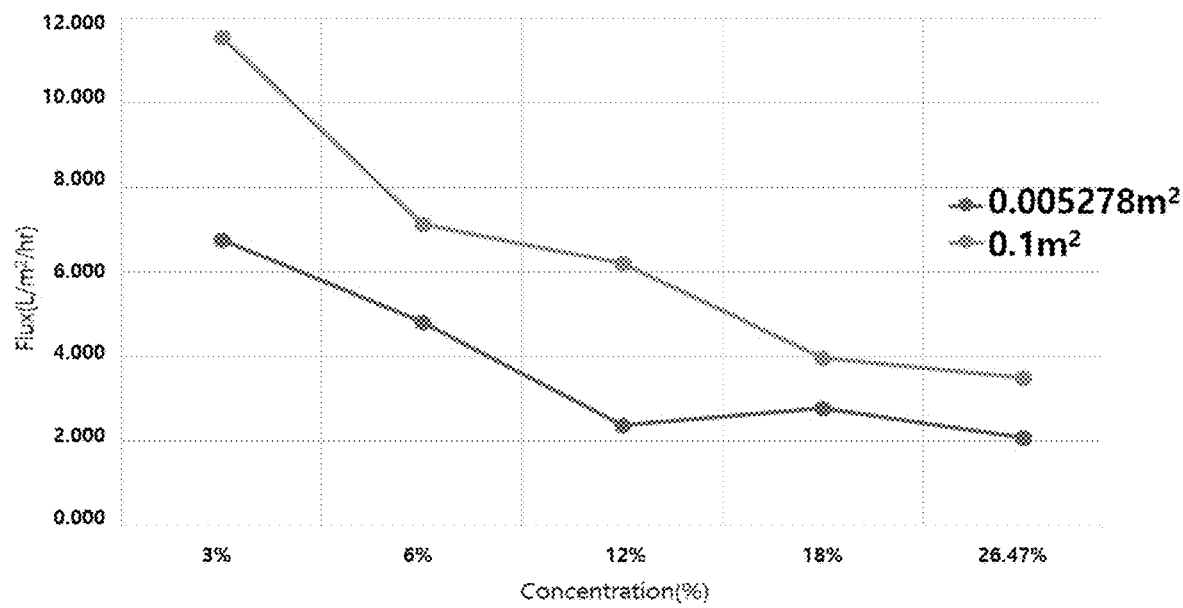

FIG. 12

| Conc. | Pressure | RE2521-SHN(0.005278m2) | | | | RE2521-SHN(0.1m2) | | | |
|---|---|---|---|---|---|---|---|---|---|
| 3% | 20 bar | 6.804 | 6.668 | 6.849 | 6.774 | 12.804 | 10.692 | 11.160 | 11.552 |
| 6% | | 4.990 | 4.604 | 4.876 | 4.823 | 6.888 | 7.530 | 7.020 | 7.416 |
| 12% | | 2.155 | 2.903 | 2.109 | 2.389 | 6.570 | 7.110 | 4.926 | 6.202 |
| 18% | | 2.790 | 2.722 | 2.835 | 2.782 | 4.428 | 4.242 | 3.276 | 3.982 |
| 26.47% | | 1.928 | 2.132 | 2.200 | 2.087 | 3.720 | 3.246 | 3.552 | 3.056 |

METHOD FOR CONCENTRATING AQUEOUS SOLUTION WITH LOW ENERGY BY USING REVERSE OSMOSIS AND FORWARD OSMOSIS IN STATE IN WHICH MULTIPLE-NO OSMOTIC PRESSURE DIFFERENCE IS INDUCED

CROSS-REFERENCE TO RELATED APPLICATIONS

This application is a United States national phase under 35 USC § 371 of International Patent Application No. PCT/KR20/03595 filed Mar. 16, 2020, which in turn claims priority under 35 USC § 119 of Korean Patent Application No. 10-2019-0029757 filed Mar. 15, 2019. The disclosures of all such applications are hereby incorporated herein by reference in their respective entireties, for all purposes.

TECHNICAL FIELD

The present invention relates to a method of concentrating a solute-containing aqueous solution to a high concentration, and more particularly to a method of concentrating a target solute-containing aqueous solution to a high concentration by removing water from the aqueous solution through a low-energy hydraulic membrane process based on reverse osmosis and forward osmosis induced under a multiple zero osmotic pressure difference (singularity) condition.

BACKGROUND ART

Table 1 below compares the advantages and disadvantages of reverse osmosis (RO), which is most frequently used in seawater desalination processes, forward osmosis (FO), in which water is recovered from seawater or sewage by a high-osmotic pressure solution in a draw chamber in order to separate an osmotic pressure draw substance and water, and a draw solution is recycled, and a method of concentrating a solute-containing aqueous solution to a high concentration by a hydraulic membrane process under a zero-osmotic-pressure-difference condition.

RO has disadvantages in that it shows a solvent recovery rate of only 50%, and most importantly, it must be performed at a pressure of 343.70 bar in a 3% NaCl saturated solution (26.47%) in order to recover 100% of a solvent and a solute. FO has the advantage of operating at atmospheric pressure, but has disadvantages in that a draw solution should be recycled and it is not easy to recover the solute if the solute flows from the feed to the draw solution (Jung et al. Process Biochemistry (2015) 50(4) 669-677). On the other hand, the method of concentrating a solute-containing aqueous solution to a high concentration by a hydraulic membrane process under a zero osmotic pressure difference condition ($\Delta\pi=0$ RO process) has a difficulty in overcoming the osmotic pressure difference that occurs as the process progresses between the feed chamber and the draw chamber.

TABLE 1

Advantages and disadvantages of methods of concentrating solute-containing aqueous solution to high concentration

| Items for comparison | RO | FO | $\Delta\pi = 0$ RO process |
|---|---|---|---|
| osmotic pressure ($\pi f - \pi d$) = $\Delta\pi$ | feed: high draw: zero $\Delta\pi > 0$ | feed: low draw: high $\Delta\pi < 0$ | feed: medium draw: medium $\Delta\pi = 0$ |
| Driving force | $\Delta P$ | $\Delta\pi$ | $\Delta P$ |
| Draw solute | None | Draw solution | Use of the same solute |
| Purpose of use | To produce pure water | To produce pure water | To produce pure water and solute |
| Recovery rate | About 50% | <100% | 100% recovery of a solute and a solvent |
| Advantages | One-step process | $\Delta P = 0$, (atmospheric pressure) | $\Delta\pi = 0$ 100% recovery of a solute and a solvent |
| Disadvantages | High-pressure process, low water recovery (50%) | Two-step process, recycling of a draw solution and penetration of a draw solution into pure water | Two-step process, $\Delta\pi = 0$ in concentration, and use of a low-pressure RO process for water recovery |
| Others | Use of RO membrane | Use of FO membrane | Use of NF and RO membranes for concentration, use of RO membrane for water recovery |
| Main use | Seawater desalination (sewage) | Seawater desalination (sewage) | Concentration of various aqueous solutions, and seawater desalination |

Currently, membrane processes are being studied with the goal of generating power through forward osmosis in addition to reverse osmosis. Thus, if these membrane processes are successfully developed, they will be capable of solving water and energy issues at the same time. If the reasons for limitation as shown in Table 1 are technologically and economically solved, the membrane processes are expected to have a significant impact on the chemical and biological industries and environmental industries.

The reverse osmosis and reverse osmosis processes have an advantage in that energy is saved due to the use of membranes, but have a disadvantage in that, as concentration progresses, the osmotic pressure in the feed chamber increases, so it is impossible to further concentrate the feed solution or to increase the utility of the feed solution (Loeb, S, Loeb-Sourirajan ACS Symposium Series, 153, 1, 1-9, 1981; Loeb, S., J. Membr. Sci, 1, 49, 1976).

Materials that are needed by humans are present as solids, liquids and gases in the sea, land and air, and are also present as independent molecules or compounds. Desired materials can be obtained through catalytic reactions, chemical reactions, biological reactions, etc.

In order to obtain the above-described materials, the present inventor previously developed a method of concentrating a solute-containing aqueous solution using a zero osmotic pressure difference concentrator comprising a feed chamber and a n-equalizer (osmotic equalizer, OE) chamber, which are separated from each other by a forward osmosis membrane and/or a reverse osmosis membrane (U.S. Pat. No. 9,950,297). However, in the above-described technology, a portion of a concentrate is used as a draw solution, and if a small amount of a n-equalizer solution is used, there is difficulty overcoming the high osmotic pressure difference between the feed chamber and the OE chamber. To overcome this difficulty, in the method developed by the present inventor, a method of reducing the residence time of the OE solution in the OE chamber is used. However, it was found that there is a problem associated with the OE chamber. Thus, the development of a novel process is needed.

To solve the problem, the present inventors also established a mass balance through two-chamber approximation, investigated how water and a salt were separated from each other in the zero-osmotic pressure difference condition, and calculated the energy required to achieve the osmotic pressure to perform this (Korean patent No. 10-1865342). In particular, it was observed that if the zero osmotic pressure difference technology was applied even at low hydraulic pressure (e.g., 50 atm), the concentration was lowered from 3% to 1.5%, and water could be recovered at 1.5% by reverse osmosis. However, this method has disadvantages in that only qualitative analysis is possible, accurate quantitative energy consumption values are not obtained, and energy consumption is extremely high.

Against this technical background, as a result of extensive efforts to solve these problems, the present inventors have found that, when a solute-containing aqueous solution to be concentrated is fed into a feed chamber and an osmotic equalizer (OE) chamber, which are separated from each other by a reverse osmosis membrane, a nano membrane or a forward osmosis membrane, included in a concentration device, $\Delta\pi$ can be removed/minimized, and thus the feed solution can be concentrated only by hydraulic pressure ($\Delta P$) under a zero osmotic pressure difference condition ($\Delta\pi=0$) or low osmotic-pressure-difference condition, and the concentrated solution of 1 volume of the total feed solution is injected into the OE chamber, and the amount of the solution directly permeating the OE chamber via the membrane is $1/n$, the supplementary feed amount is adjusted to $(1-1/n)$ based on the velocity, and the amount of the feed entering the multiple zero-osmotic pressure difference chamber is always 1, 50% and 75% of the solvent can be recovered at a recovery rate of 50% of a conventional commercial process with an energy lower than 1 kWh/m$^3$ depending on the selectivity of the membrane. Based on this finding, the present invention was completed.

DISCLOSURE

Therefore, the present invention has been made in view of the above problems, and it is an object of the present invention to provide a method of concentrating a solute-containing aqueous solution containing volatile organic acids and various types of low-molecular-weight substances having properties similar thereto, the method being capable of minimizing energy and operating costs while maximizing the concentration effect of the solute-containing aqueous solution.

In accordance with one aspect of the present invention, the above and other objects can be accomplished by the provision of a method of concentrating a solute-containing solution under a $\Delta\pi$ reduction condition in a feed output split counter-current (FOS-CC) manner using a zero osmotic pressure difference concentrator including a multiple zero osmotic pressure difference chamber and an external reservoir (ER), wherein the multiple zero osmotic pressure difference chamber includes a feed chamber, an osmotic equalizer chamber (OE chamber), and an osmotic membrane disposed between the feed chamber and the osmotic equalizer chamber, and a ratio of a velocity of the osmotic equalizer chamber (OE-vel) to a velocity of the feed chamber (F-vel) satisfies Equation 1 below;

$$OE\text{-}vel/F\text{-}vel=1/n \qquad \text{Equation 1:}$$

wherein a part (Q1) of a concentrated solution is output from the multiple zero osmotic pressure difference chamber, and another part (Q2) thereof is recycled in a counter-current direction to the feed to the osmotic equalizer chamber of the multiple zero osmotic pressure difference chamber, wherein a velocity of the recycling (OE-Vel) is higher than a velocity of the output (F-Vel), wherein n is a real number from 2 to 40, a sum of Q1 and Q2 is equal to a total weight of the solution concentrated in the multiple zero osmotic pressure difference chamber, F-vel is an output velocity of Q1, and OE-vel is a recycle velocity of Q2.

In accordance with another aspect of the present invention, provided is a method of separating a solvent and a solute from a solute-containing aqueous solution using the method described above.

In accordance with another aspect of the present invention, provided is a multiple zero osmotic pressure difference module.

DESCRIPTION OF DRAWINGS

FIG. 3 shows in part (A) a schematic diagram and in part (B) an image showing an experimental device for evaluating the flow rate and the selectivity of the osmotic membrane in the zero osmotic pressure difference experiment using a general reverse osmosis membrane according to the present invention, wherein a process in which, starting from the complete zero-osmotic pressure difference, an about 10%-15% solution flows from a high-pressure chamber to a low-pressure chamber, was measured using a digital balance with an accuracy of 0.01 g.

FIG. 7 shows the result of calculation of the change in membrane flux according to the flow rate of the OE chamber in the multiple zero-osmotic pressure difference RO system according to an embodiment of the present invention.

FIG. 10 in part (A) shows a schematic diagram illustrating a multiple zero osmotic pressure difference module according to an embodiment of the present invention, wherein S-Δπ-0 RO and M-Δπ-0 RO modules have two inlets (feed high-pressure inlet and OE low-pressure inlet) and two outlets (feed high-pressure outlet and OE low-pressure outlet), withstand high pressure, and function well as the zero osmotic pressure difference RO, but has functions remarkably different from those of general RO modules, and this module is connected to FOS-CC (feed output split counter current) to control the pressure (e.g. 3%=>1.59%), and then 1.59% is connected to the inlet of the RO module such that water is produced and concentrated solution is discharged to the outside or recycled to the feed, and FIG. 10 in part (B) shows a schematic diagram illustrating a FOS-CC system using an envelope-type flat membrane having a spirally wound form (with two inlets and two outlets) as a multiple zero osmotic pressure difference module.

FIG. 11 in part (A) shows an image showing a device used for scaling up the module according to an embodiment of the present invention, and FIG. 11 in part (B) shows the result of measurement of flux depending on the size of a flat membrane.

FIG. 12 is a table of comparison data, including concentration, pressure, and flux values, for a module with membrane area of 0.005278 m$^2$ and for a scale-up module with membrane area of 0.1 m$^2$.

BEST MODE

Figure 1:
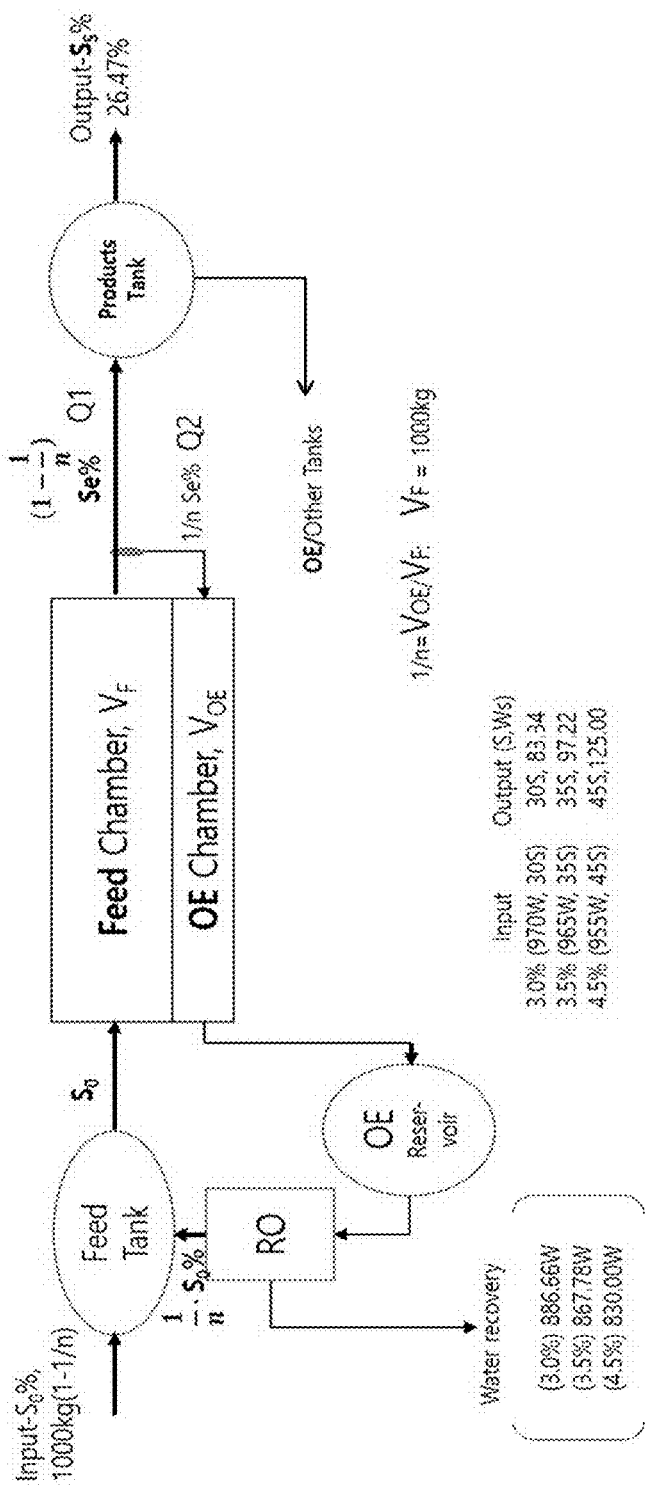
FIG. 1 is a schematic diagram illustrating a principle and mass balance of a low-energy M(multiple)-$\Delta\pi=0$ RO system according to an embodiment of the present invention, wherein the system includes a system input (1000 kg solution), a M-$\Delta\pi=0$ RO module, and a system output (water recovery-RO, concentrated water output), and the mass balance is realized between 1000 kg ((970 kg-W(water), 30 kg(S-salt)) of a 3% solution, and the sum of recovery of 866 kg of water from RO and output of a saturated solution containing 30 kg of a salt and 83.34 kg of water, M-$\Delta\pi=0$ RO ensures that 1/n of feed output is recycled to OE-input, and this process is characterized in that the velocity of the solution in the OE chamber is increased because the OE chamber is smaller than the feed chamber.

Unless defined otherwise, all technical and scientific terms used herein have the same meanings as appreciated by those skilled in the field to which the present invention pertains. In general, the nomenclature used herein is well-known in the art and is ordinarily used.

The present invention is aimed at determining whether or not the problems of mass balance and high energy consumption, which could not be solved by the previous invention (U.S. Pat. No. 9,950,297, KR 10-1865342), can be solved using the forward osmosis method through a multiple zero osmotic pressure difference device and recycling of the final concentrate.

The present invention is aimed at determining whether or not the energy consumed for concentration and solution/solute recovery can be remarkably reduced when water is discharged to the outside from various kinds of solute-containing aqueous solutions to be concentrated using a reverse osmosis pressure separator, and the concentrated aqueous solution is fed into a feed chamber and an osmotic equalizer chamber (OE chamber), which are separated from each other through a reverse osmosis membrane or a forward osmosis membrane, included in a multiple zero osmotic pressure difference concentrator, the feed solution is concentrated at only a low pressure, at which the osmotic pressure difference between the feed chamber and the OE chamber is close to 0 (Δπ=0), a part of the feed solution is recycled, and these processes are repeated.

That is, in an embodiment of the present invention, it was found that the solute-containing aqueous solution can be concentrated using a remarkably low energy by feeding an aqueous solution to be concentrated into a feed chamber and an osmotic equalizer chamber (OE chamber), which are separated from each other through a reverse osmosis membrane or a forward osmosis membrane, included in a multiple zero osmotic pressure difference concentrator, concentrating the solution at a low pressure, injecting a part of the concentrated solution (1/n) into the osmotic equalizer chamber of the multiple zero osmotic pressure difference concentrator in a counter-current direction, recycling the solution, storing the solution output from the osmotic equalizer chamber in the counter-current direction in an exterior reservoir (ER chamber), producing water using a reverse osmosis device, and recycling the remaining solution back to the feed solution.

That is, in one aspect, the present invention is directed to a method of concentrating a solute-containing solution under a Δπ reduction condition in a feed output split counter-current (FOS-CC) manner using a zero osmotic pressure difference concentrator including a multiple zero osmotic pressure difference chamber and an external reservoir (ER), wherein the multiple zero osmotic pressure difference chamber includes a feed chamber, an osmotic equalizer chamber (OE chamber), and an osmotic membrane disposed between the feed chamber and the osmotic equalizer chamber, and a ratio of a velocity of the osmotic equalizer chamber (OE-vel) to a velocity of the feed chamber (F-vel) satisfies Equation 1 below;

$OE\text{-}vel/F\text{-}vel = 1/n$  Equation 1:

wherein a part of the concentrated solution (Q1) is output from the multiple zero osmotic pressure difference chamber, and another part (Q2) thereof is recycled in a counter-current direction to the feed to the osmotic equalizer chamber of the multiple zero osmotic pressure difference chamber, wherein a velocity of the recycling (OE-Vel) is higher than a velocity of the output (F-Vel), wherein n is a real number from 2 to 40, a sum of Q1 and Q2 is equal to a total weight of the solution concentrated in the multiple zero osmotic pressure difference chamber, F-vel is an output velocity of Q1, and OE-vel is a recycle velocity of Q2.

In the present invention, the F-vel may be calculated using the following Equation:

$$Q1/(W*F\text{-}h) \quad \text{Equation 5:}$$

In the present invention, the OE-vel may be calculated using the following Equation:

$$OE\text{-}vel = Q2/(W*OE\text{-}h) \quad \text{Equation 6:}$$

wherein W means a length in a fluid flow direction, F-h means a height of the feed chamber, and OE-h means a height of the osmotic equalizer chamber.

If the membrane area A is defined as an area shared by the feed chamber in the fluid flow direction and the OE chamber, the cross-section area of W*F-h and W*OE-h means the area in a direction perpendicular to the fluid flow.

As used herein, the term "multiple zero osmotic pressure difference chamber" means that an osmotic pressure changes in one chamber, but an osmotic pressure difference between the feed chamber and the OE chamber at each point is zero.

As used herein, the term "feed output split counter current", "FOS-CC" or "FOS-CC process" means that the feed solution and a solution injected into the OE chamber flow in opposite directions, and refers to a process of reusing a part of the output of the feed solution in a portionwise manner.

In the present invention, the external reservoir (ER) may be installed outside or inside the multiple zero osmotic pressure difference chamber, but is preferably installed outside.

In the present invention, the zero osmotic pressure difference concentrator may further include a reverse osmosis chamber that functions to recover the concentrated solution or the solute.

In the present invention, the recycling velocity (OE-Vel) may be 1 to 30 times the output velocity (F-Vel). At this time, if the OE output that has passed through the external reservoir is immediately discharged to the outside without being recycled to the feed chamber, there is no limitation as to OE-Vel.

Hereinafter, the method of the present invention will be described in detail with reference to FIG. 1.

An M-zero osmotic pressure difference chamber including a feed chamber and an osmotic equalizer chamber (OE chamber), and an external reservoir (ER chamber) that stores a solution in an amount corresponding to the volume of the osmotic equalizer chamber are installed outside or inside the M-zero osmotic pressure difference chamber (FIG. 1).

The ratio of the volume of the OE chamber (Voe) to the volume of the feed chamber (Vf) is determined using the following Equation 1:

$$OE\text{-}vel/F\text{-}vel = 1/n \quad \text{Equation 1:}$$

If, in the feed out split countercurrent (FOS CC) process, the split ratio is set to [1/n] and the volume of the OE chamber is reduced at the same time, the condition of $M\Delta\pi = 0$ (zero osmotic pressure condition: singularity zero) is established.

In the present invention, the ratio of the volume of the osmotic equalizer chamber (Voe) to the volume of the feed chamber (Vf) satisfies the following Equation 2, and the volume of the osmotic equalizer chamber (Voe) and the volume of the feed chamber (Vf) are calculated using the following Equations 3 and 4, respectively:

$$Voe/Vf = 1/n \quad \text{Equation 2:}$$

$$Voe = A*OE\text{-}h \quad \text{Equation 3:}$$

$$Vf = A*F\text{-}h \quad \text{Equation 4:}$$

wherein A is an area of the osmotic pressure membrane shared by the feed chamber and the osmotic equalizer chamber, OE-h is a height of the feed chamber, and F-h is a height of the osmotic equalizer chamber.

The feed input is a combination of an amount of 1 of an external input stream and an amount of 1/n of a recycle stream (1) is incorporated at a total concentration of 1 as an input of the feed chamber, (2) is low in concentration in the initial state, but is saturated while losing water and salt to the OE chamber, and is converted to a feed output at a concentration of (1-1/n), and (3) the feed output is split into a 1/n recycle stream and a (1-1/n) output stream.

Meanwhile, in the OE chamber, (4) 1/n of a saturated state is received, flows in a counter-current direction to the feed stream, is diluted in the water and salt supplied from the feed chamber, and the output from the OE chamber passes through the external reservoir.

(5) Water is removed from the RO chamber, and the same concentration as that of 1/n*input is obtained.

(6) a total input concentration of 1 is joined with the feed stream or is split.

(7) For reference, depending on the solute selectivity of the membrane, only the water entering the osmotic equalizer chamber is permeated from the feed chamber if the selectivity is 1.0, or the solute also passes through the membrane and is fed in a diluted state into the RO chamber if the selectivity is low.

When the M-zero osmotic pressure difference (singularity zero) requirement is satisfied, (1) geometrically, when the volume ratio of the osmotic equalizer (OE) chamber/feed chamber is greater than 1/n, forward osmosis is realized, or (2) even when the flux (concentration*flow rate) of the flowing recycle stream is greater than the flux of the feed stream, forward osmosis is realized.

In the opposite case of (1) and (2), an RO state is realized.

In the present invention, the volume ratio may be adjusted depending on the density of the concentrated solution.

In the present invention, energy consumption decreases as the concentration of the concentrated solution in the multiple zero osmotic pressure difference chamber decreases.

In other words, input excluding the feed stream or output OE stream excluding water and saturation concentration is not considered, but energy consumption may vary when the target concentration degree is not set to a saturation concentration and recovery (%) is low (300, 500, 75%).

In the present invention, the solution that has been recycled in the counter-current direction to the feed chamber and then passed through the zero osmotic pressure difference chamber has an osmotic pressure higher than that of the feed chamber, so water is recovered from the feed chamber through forward osmosis.

In the present invention, the method using the zero osmotic pressure difference concentration chamber may include:
   (i) transferring the solute-containing aqueous solution to the feed chamber of the zero osmotic pressure difference chamber, feeding a solution having the same osmotic pressure as the aqueous solution transferred to the feed chamber to the osmotic equalizer chamber to form a zero osmotic pressure state between the feed chamber and the osmotic equalizer chamber; and
   (ii) transferring water from the aqueous solution to the osmotic equalizer chamber by applying a pressure of 10 to 100 atm to the feed chamber through the reverse osmosis membrane in the zero osmotic pressure state to concentrate the aqueous solution.

In the present invention, the method may further include passing the output of the osmotic equalizer chamber of the zero osmotic pressure difference concentrator as a feed stream through a second zero osmotic pressure difference concentrator to increase the concentration efficiency.

In the present invention, the osmosis membrane may be a reverse osmosis membrane, a forward osmosis membrane, or a nanofiltration membrane, but is not limited thereto.

In the present invention, the osmotic membrane may be a commercially available membrane having a selectivity lower than 1.

In the present invention, the method may further include recovering a solidified solute from the concentrated solute-containing aqueous solution using thermal energy, electrical energy, or pressure.

In the present invention, the pH of the aqueous solution may be 3 to 11, and the temperature may be a temperature at which water remains in a liquid state.

In the present invention, the concentration may be carried out in a batch method or a continuous method.

The present invention is directed to a method of separating a solvent and a solute from a solute-containing aqueous solution using the method described above.

In the present invention, the solute may be a salt or a liquid, and the solvent may be water, but is not limited thereto. That is, it will be apparent to those skilled in the art that even when the solvent is a non-hydrophilic organic solvent, the solvent and the solute can be separated using the method of the present invention.

In the present invention, the method of independently recovering the solute and the solvent is selected from the group consisting of multistage evaporation, distillation, pervaporation, pyrolysis, sulfuric acid-based methods, and ammonia-, sodium-, and calcium salt-based precipitation methods.

In another aspect, the present invention is directed to a multiple osmotic pressure difference module.

In the present invention, the multiple osmotic pressure difference module preferably has the following characteristics:
   (1) A feed and OE solution should flow in counter-current directions via a membrane interposed therebetween.
   (2) The ratio of the volume of the OE chamber to the volume of the feed chamber should be less than 1.
   (3) Feed input, feed output, OE input and OE output should be applied; in other words, a two-input two-output system should be applied.
   (4) A hollow fiber or ceramic film having a small diameter capable of withstanding high pressure may be coated with an RO membrane.
   (5) A spiral wound module may be configured with an envelope-type flat membrane or a plate-type stack may be used.

EXAMPLE

Hereinafter, the present invention will be described in more detail with reference to examples. However, it will be obvious to those skilled in the art that these examples are provided only for illustration of the present invention, and should not be construed as limiting the scope of the present invention.

Example 1. Calculation of Singularity RO

As shown in FIG. 1, the feed input in the mass balance is always maintained at 1 (ton), which is the sum of (1-1/n) of a stream added from the outside and 1/n of a stream returned after being recycled.

The total mass balance satisfies the equation input 1.0=feed output (1-1/n)+recycle 1/n.

The (1-1/n) portion is exported as the feed-out*, and thus satisfies the mass balance. The remainder, 1/n, is the amount that is continuously recycled.

Meanwhile, the recycling velocity satisfies the equation OE-vel/F-vel=(1/n). In the case where n=2, OE-vel is double F-vel, and thus the residence time ($\theta$) in the OE chamber is ½($\theta$) of that in the feed chamber.

In consideration of this residence time condition, when a feed concentration is converted from 3% to 24% (30S, 95W), 11.67 kg of water is used to saturate a salt solution and (30S, 83.33W) is obtained. When 50% of the concentrated salt solution is output and 41.67 kg of water is recycled, 26.47% (15S, 41.67W) is obtained. When the feed and feed output are split and reach OE, the osmotic pressure difference becomes zero (i.e., $\Delta\pi=0$ (the amount is different, but the concentration is the same).

The NaCl concentration in the OE chamber is 15/(15+41.67W+11.67W)=21.94%. When the NaCl concentration is 24%, the osmotic pressure is 296.397 bar, and when the NaCl concentration is 22%, the osmotic pressure is 260 bar. At this time, $\Delta\pi$ is 36.397 bar. However, when ½ as the OE residence time and 11.67*0.5=5.83 instead of 11.67 are applied to the above equation, the result 15/(15+41.67+5.83)= 24.0% is obtained. At this time, $\Delta\pi=0$ is satisfied.

In other words, the zero osmotic pressure state can be maintained by reducing the residence time.

Figure 2:
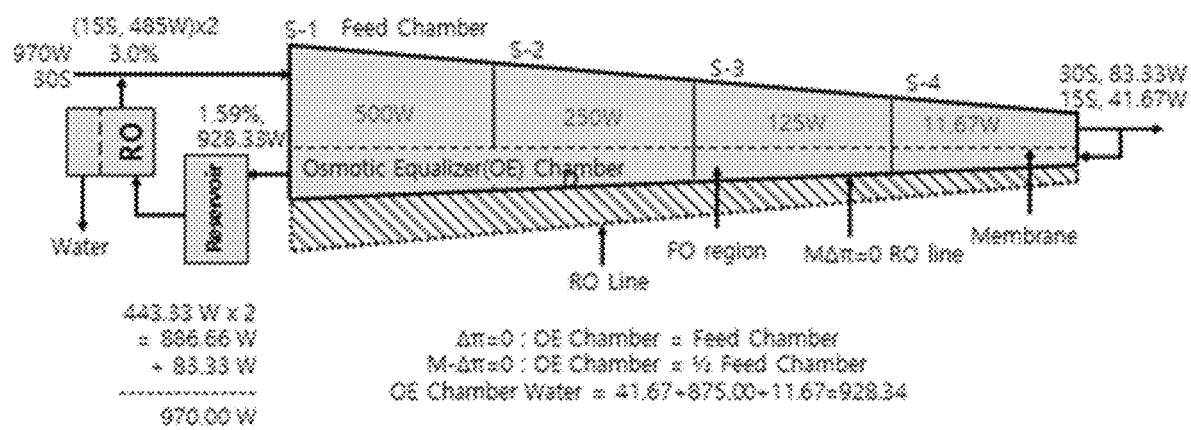
FIG. 2 is another schematic diagram illustrating a principle and mass balance of an M (multiple)-Δπ=0 RO system according to an embodiment of the present invention.

FIG. 2 shows that 30/(30+95W)=24% at a feed concentration of 24% forms singularity RO with 15/(15+47.5W)= 24% in the OE chamber.

This is repeated to create the zero osmotic pressure difference state between the feed and the OE chamber at 12%, 6%, and 3% to thus realize M–$\Delta\pi=0$. The volume of the OE chamber (Voe) is ½ of that of the feed chamber (Vf).

FIG. 2 also shows the RO region, the FO region, and M–$\Delta\pi=0$ RO according to the size of the OE chamber. The energy is required only for the RO region, and when the feed is converted from 3% to 26.47%, the feed solution itself has a lot of energy, so RO loses the concentrated solution, but at M–$\Delta\pi=0$ RO, this energy is reversibly used. The singularity RO region has theoretically zero energy, but energy is consumed at OE-output having a reduced concentration.

TABLE 2

|  | salt | water |  |  |  |  |  |  |  |  | RT | Total RT |
|---|---|---|---|---|---|---|---|---|---|---|---|---|
| Feed | 30 | 970 | 3.00% | 6.00% | 12.00% | 24.00% | 26.47% | 3.00% |  |  | 1 |  |
| S-$\Delta\pi$ = 0 RO | 15 | 928.33 | 1.59% | 3.38% | 7.76% | 21.95% | 26.47% | 1.59% | 1.716 | 1.937 | 1 | 1 |
| M-$\Delta\pi$ = 0 RO | 15 | 485 | 3.00% | 6.00% | 12.00% | 24.00% | 26.47% | 1.50% | 1.000 | n = 2 | 0.5 | 1 |
| ibid | 10 | 323.33 | 3.00% | 6.00% | 12.00% | 24.00% | 26.47% | 1.00% | 0.000 | n = 3 | 0.333 | 1 |
| ibid | 7.5 | 242.5 | 3.00% | 6.00% | 12.00% | 24.00% | 26.47% | 0.75% | 0.000 | n = 4 | 0.250 | 1 |
| ibid | 3 | 97 | 3.00% | 6.00% | 12.00% | 24.00% | 26.47% | 0.30% | 0.000 | n = 10 | 0.100 | 1 |
| ibid | 1 | 9.7 | 3.00% | 6.00% | 12.00% | 24.00% | 26.47% | 3.00% | 0.000 | n = 1/30 | 0.033 | 1 |

The most important feature of the present invention is understanding how singularity RO is formed. Singularity RO is applicable regardless of all concentrations of feed solution and OE solution, and this technology is inapplicable to RO with $\sigma=1$, but is applicable to single(S) with $\sigma<1$ and single (S)–$\Delta\pi=0$ RO, M–$\Delta\pi=0$ with $\sigma=1$ or $\sigma<1$. 1 ton of a 3% solution input as a feed solution means that 970 kg W and 30 kg S are input. At this time, the concentration satisfies 3% (w/w)=30S/(30S+970W). Interestingly, the value of 3% can be obtained in several ways.

For example, if the numerator and denominator of 30S/(30S+970) are each multiplied by 0.1, 3S/(3S+97W) is obtained, and if they are each multiplied by 0.5, 15S/(15A+97*0.5W)=3% is obtained. The concentration of the feed solution is 3%, obtained from 30S and 970W, but the concentration of the OE solution is 3%, which may be determined in several ways depending on the salt concentration of the OE solution. This is the principle of M–$\Delta\pi=0$ RO.

Several requirements must be fulfilled. It is important that a salt is continuously supplied to the feed and OE. The supply conditions of salt may change. In this case, if the structure of the module changes depending on such a change, M–$\Delta\pi=0$ is satisfied. If not, M–$\Delta\pi=0$ is not satisfied. The second requirement is as follows. The feed solution and the OE solution share the same membrane area and thus the velocity is increased in a small-volume OE solution chamber. When 500 L of water penetrates the membrane, and the concentration is changed from 3% to 6%, the OE solution should consume all of the corresponding amount of water within a shortened resistance time.

In a general logic, to reduce the dilution rate of the OE chamber having a low salt concentration, the residence time in the OE chamber must be reduced in order for the OE chamber to dilute as low as possible the amount thereof that permeates from the feed chamber to the osmotic membrane.

In the case of Coe=15 g/L and Cfeed=30 g/L, the channel height (Hoe=[Coe/Cfeed]*Hfeed) of the OE chamber is Hoe=Hfeed*15/30=½ Hfeed, and the residence time is ½. When Coe is 5 g/L, 7.5 g/L and 10 g/L, Hoe is ⅙, ¼ and ⅓, and the residence time is ⅙, ¼, ⅓, respectively. In order to process the Cfeed, 6 times, 4 times, and 3 times the Vfeed volume are required for the Coe. In order to recover a lot of water and save a lot of energy, it is of course necessary to reduce the amount of salt input to the OE chamber. In principle, up to n=30, the increase in kinetic energy due to the increase in speed is not a problem, but in practice, if ⅓ or ¼ is connected in series, it is possible to reduce the energy of the OE output to about 1/10.

In FIG. 1, when the OE input passes through the singularity point at a high velocity and accumulates in the external reservoir (OE-ER), the concentration returns to the original level. Therefore, the concentration of OE-ER becomes 3.00%, 2.5%, 2.0%, and 1.5%.

When the OE 3% is converted to energy, 0.659 kWh/m3-solution (in case of solution) and 0.680 kWh/m3-W (in case of pure water) are obtained.

Example 2: Calculation of Energy Consumption in Case of $\sigma<1$ 2-1. Reverse Osmosis

TABLE 3

| 3% NaCl | Feed salt | 970.00 | OE | leaked S | 3.00% $\Delta\pi$-FE/OE | % OE | OE-bar | RO1-Energy | $\Delta\pi$ (MPR-basis bar) | | |
|---|---|---|---|---|---|---|---|---|---|---|---|
| 3.00 | 30.00 |  | MPW |  |  | 16.68 | 1.715% | 13.24 | 23.73 | 10.49 | 9.58E-02 |
| 4.00 | 29.16 | 700.00 | 270.00 | 0.84 | 0.00% | 4.00% | 15.84 | 2.213% | 17.25 | 32.30 | 15.05 | 7.80E-02 |
| 5.00 | 28.37 | 539.00 | 431.00 | 0.78 | 0.16% | 5.00% | 15.05 | 2.716% | 21.39 | 41.23 | 19.85 | 6.65E-02 |
| 6.00 | 27.61 | 432.50 | 537.50 | 0.78 | 0.38% | 6.00% | 14.29 | 3.198% | 25.43 | 50.53 | 25.10 | 5.87E-02 |
| 7.00 | 26.86 | 357.00 | 613.00 | 0.76 | 0.67% | 7.00% | 13.54 | 3.655% | 29.35 | 60.21 | 30.86 | 5.34E-02 |
| 8.00 | 26.31 | 300.50 | 669.50 | 0.75 | 1.03% | 8.00% | 12.81 | 4.088% | 33.09 | 70.27 | 37.18 | 4.91E-02 |
| 9.00 | 25.40 | 257.00 | 713.00 | 0.73 | 1.48% | 9.00% | 12.08 | 4.491% | 36.69 | 80.74 | 44.05 | 4.62E-02 |
| 10.00 | 24.68 | 222.20 | 747.80 | 0.72 | 2.03% | 10.00% | 11.36 | 4.866% | 40.04 | 91.63 | 51.59 | 4.36E-02 |
| 11.00 | 23.97 | 197.00 | 776.00 | 0.71 | 2.67% | 11.00% | 10.65 | 5.205% | 43.14 | 102.95 | 59.81 | 4.18E-02 |
| 12.00 | 23.23 | 170.60 | 799.40 | 0.71 | 3.41% | 12.00% | 9.84 | 5.506% | 45.94 | 114.71 | 68.77 | 4.01E-02 |
| 13.00 | 22.55 | 151.00 | 819.00 | 0.71 | 4.27% | 13.00% | 9.23 | 5.763% | 48.33 | 126.94 | 78.62 | 3.92E-02 |
| 14.00 | 21.85 | 134.20 | 835.80 | 0.70 | 5.27% | 14.00% | 8.53 | 5.977% | 50.32 | 139.64 | 89.32 | 3.81E-02 |
| 15.00 | 21.15 | 119.80 | 850.20 | 0.70 | 6.377% | 15.00% | 7.83 | 6.135% | 51.84 | 152.83 | 101.00 | 3.70E-02 |
| 16.00 | 20.45 | 107.40 | 862.60 | 0.70 | 7.61% | 16.00% | 7.13 | 6.226% | 52.72 | 166.52 | 113.81 | 3.66E-02 |
| 17.00 | 19.75 | 96.48 | 873.52 | 0.70 | 9.01% | 17.00% | 6.43 | 6.252% | 52.97 | 180.75 | 127.78 | 3.63E-02 |
| 18.00 | 19.06 | 86.84 | 883.16 | 0.69 | 10.55% | 18.00% | 5.74 | 6.200% | 52.46 | 195.50 | 143.08 | 3.53E-02 |
| 19.00 | 18.37 | 78.32 | 891.68 | 0.69 | 12.26% | 19.00% | 5.05 | 6.056% | 55.43 | 210.80 | 155.37 | 3.53E-02 |
| 20.00 | 17.68 | 63.92 | 899.30 | 0.69 | 14.13% | 20.00% | 4.36 | 5.809% | 48.75 | 226.70 | 177.94 | 3.53E-02 |
| 21.00 | 17.00 | 57.83 | 906.08 | 0.69 | 16.16% | 21.00% | 3.68 | 5.437% | 45.30 | 243.12 | 197.82 | 3.54E-02 |
| 22.00 | 16.31 | 52.35 | 912.17 | 0.68 | 18.36% | 22.00% | 2.99 | 4.922% | 40.54 | 260.26 | 219.72 | 3.53E-02 |
| 23.00 | 15.64 | 47.39 | 917.65 | 0.68 | 20.73% | 23.00% | 2.32 | 4.238% | 34.43 | 277.84 | 243.41 | 3.52E-02 |

TABLE 3-continued

| 3% NaCl | Feed salt | 970.00 | OE | leaked S | 3.00% | Δπ-FE/OE | % | OE | OE-bar | RO1-Energy | Δπ (MPR-basis bar) | |
|---|---|---|---|---|---|---|---|---|---|---|---|---|
| 24.00 | 14.96 | 42.88 | 922.61 | 0.67 | 23.26% | 24.00% | 1.64 | 3.352% | 26.75 | 296.32 | 269.58 | 3.55E−02 |
| 25.00 | 14.30 | 37.00 | 927.12 | 0.67 | 25.96% | 25.00% | 0.98 | 2.224% | 17.34 | 315.09 | 297.75 | 5.17E−02 |
| 26.00 | 13.32 | 14.33 | 933.00 | 0.97 | 31.07% | 26.00% | 0.00 | 0.007% |  | 335.05 | 335.05 | 2.14E−01 |
| 26.47 |  |  | 955.67 |  | 53.80% | 26.47% |  |  |  | 343.67 | 343.67 | 1.273E+00 |

In the table above, the osmotic pressure depending on percentage (%, OLI) is given in RO-1 (third column from the left). Recently, the present research team developed an approximation equation that can replace the OLI equation and obtained an approximation equation that approximates the OLI equation with 0.1% accuracy (Korean J. Chem. Eng., 37(2), 1-6 (2020) DOI: 10.1007/s11814-019-0460-2 RAPID COMMUNICATIONS, pISSN: 0256-1115 eISSN: 1975-7220).

Figure 6:
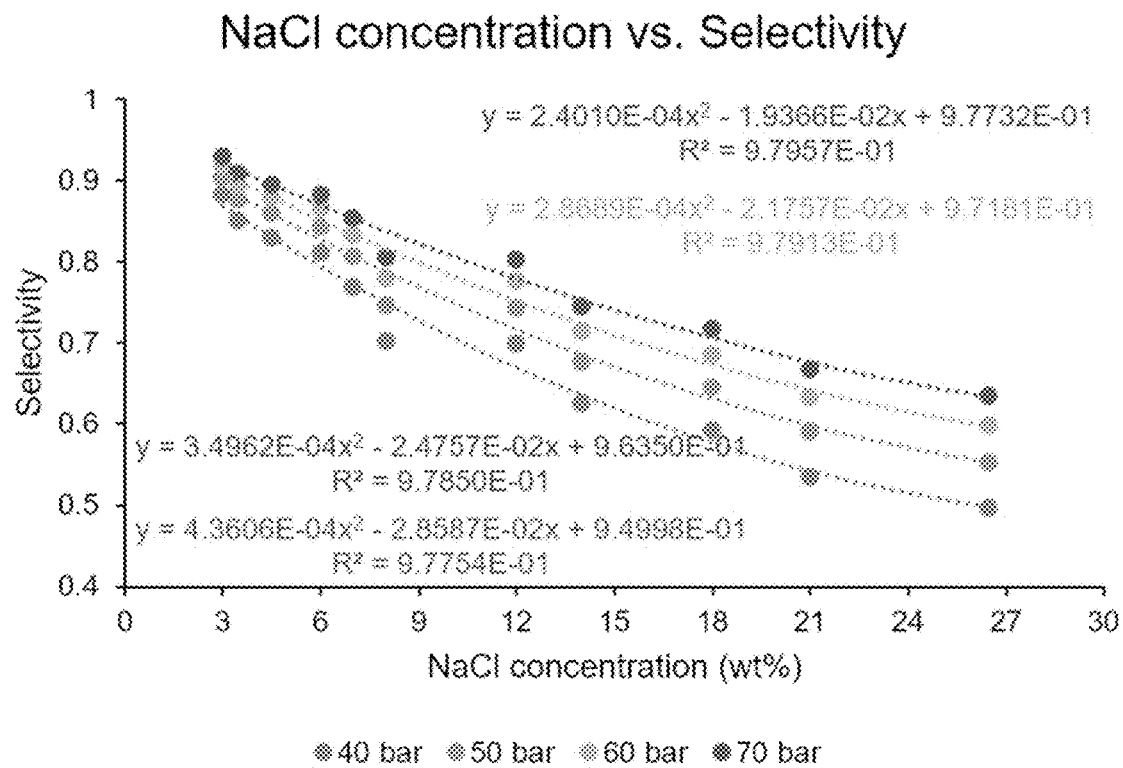
FIG. 6 shows the result of concentration of a NaCl solution according to the membrane selectivity according to an embodiment of the present invention.
Figure 8:
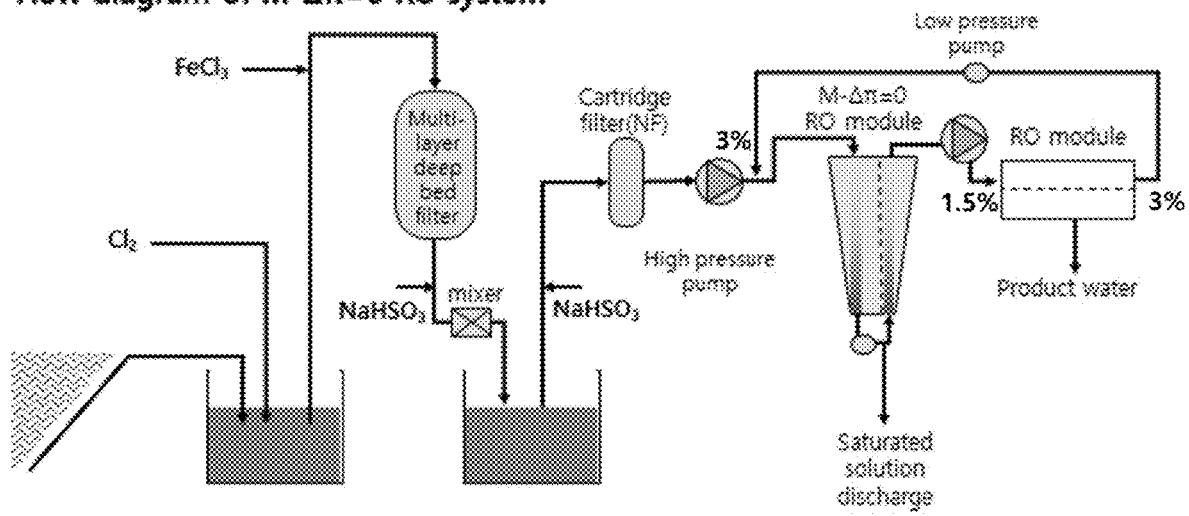
FIG. 8 is a flow diagram illustrating a principle of a seawater desalination device according to an embodiment of the present invention.
Figure 9:
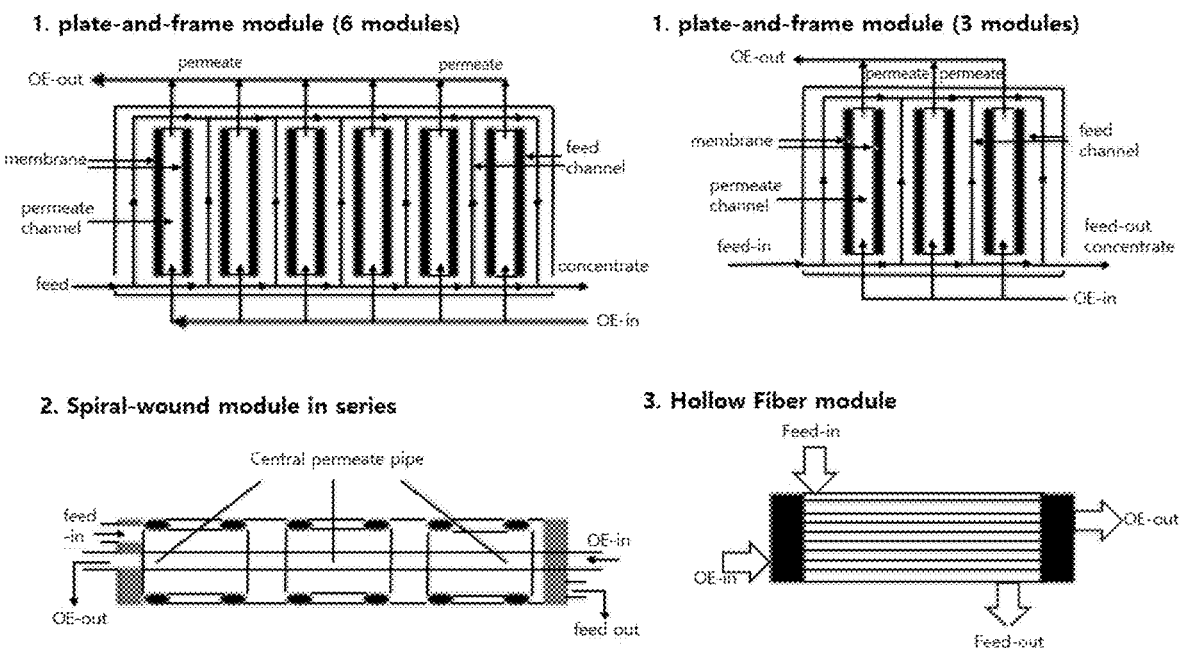
FIG. 9 is a schematic diagram illustrating a multiple zero osmotic pressure difference module for implementing the method of the present invention.

(1) In the case of σ<1 (RE2521 RO membrane), ΔP=70 bar is applied,
(2) it can be seen that a start weight of NaCl is 30 g, 13.32 g of a feed solution at 26.00% was left, and 16.68 g (30 g-13.32 g) is input to the OE chamber. It can be seen that the amounts of leaked salt are 0.84 g and 0.79 in 3 and 4%, and 0.97 g in 26%, and that leakage from the membrane occurs every time the percentage changes.
(3) The leaked salt flows in a counter-current direction and does not accumulate at 26.00%, but is 16.68 g at 3.00%, and accumulates at an OE-output concentration.
(4) The leaked salt accumulates and forms an osmotic pressure in the OE chamber. At 25%, 2.224%, 16%, 6.226% and 3.00%, 1.715% is obtained.
(5) Generally, in the case of σ=1, the energy of the saturated solution is 1.716 kWh, but in this case, is 1.273 kWh (74.2% of the maximum) due to the leaked osmotic pressure.
(6) The amount of water that can be recovered at 6.0% is 537.50 kg, the amount that can be recovered at 5% is 431 kg, and the percentage that enables recovery of 500 kg is 5.45%. The percentage that enables recovery of 750 L is about 10.5%. The amount of leaked salt can be predicted to be 2%+(500 L) and 5% (+) (750 L). The selectivity of the membrane used herein is a value obtained by applying the value directly measured in the experiment of FIG. 4 to the equation (FIG. 6).
(7) If σ is less than 1, a large amount of the solution is required to saturate 3.0%. For example, a 1000 kg of a solution is saturated at 886.66 kg in case of σ=1, but 1140 kg of a solution is required in the case of σ<1.
(8) The salt has an initial weight of 30 kg, but at 26.47%, 16.68 kg of the salt permeates into the OE solution, and the remaining amount thereof is 13.32 kg. In this way, the amount of salt that permeates into the OE is small, but at 26.47%, is 16.68 kg at the OE output, and the concentration thereof reaches 1.715%. So, in the case of RO, 3% and 23.73 bar are obtained, but the actual osmotic pressure is 23.73-13.24=10.49. In other words, the energy is reduced.
(9) Overall, when 500 L water is recovered, a total energy of 0.549 kWh/m3, which is the sum of MPR (membrane permeation energy) of 0.448 kWh/m3 and OE-output energy of 0.101 kWh/m3, is required. When 750 L is recovered, 0.915 kWh/m3, which is the sum of 0.776 kWh/m3 and 0.149 kWh/m3, is required. Here, m3 means a solution. In addition, for a Sat' solution, 1.273 kWh/m3 is required. When 500 L is recovered, a salt output is 2.39 g, and when 750 L is recovered, a salt output is 532 g and the Sat' solution is 16.66 kg.
(10) When singularity RO is applied, MPR is 1/(30/2.39)= 1/12.55 and 1/(30/5.32)=1/5.36 at 500 L and 750 L, respectively. However, in practice, the start concentration should be 1/30 at 500 L and 750 L. Thus, it is difficult to practically apply singularity RO.
(11) However, if ⅓ and ¼ are applied, the start at 500 L and 750 L will always be changed as follows: 1/30==>1/12.55 and 1/30==>1/5.36.
(12) In conclusion, application of singularity RO is theoretically possible, but is difficult in practice. It would be advantageous to apply single Δπ=0 RO.

2-2. S−Δπ=0 RO

Since σ is less than 1, leakage cannot be prevented. However, in the case of 500 L, the leakage amount is 2.39 g. In the case of 750 L, the leakage amount is 5.32 g. Thus, if the recycling amount is adjusted to 5 g/L of the OE chamber in the case of 500 L and 10 g/L of the OE chamber in the case of 750 L, membrane permeation energy (MPE) is zero. If only reverse osmosis energy is calculated, a variable OE depth is assumed to adjust the total membrane permeation energy to zero. The first concentration of Δπ=0 is 23% (feed 15 g, OE 15 g).

B-1 is 500 L 0.239%*7.6/36=0.050 kwh/m$^3$, but when 50% is recycled,
15 g/(15 g+500+470*0.5)=2.00% is obtained.
Water recovery energy is 15.519/36=0.431 kWh/m$^3$.
B-2 is 750 L 0.532%*7.6/36=0.112 kwh/m$^3$, but 15/(15+750+220*0.5)=1.714% is obtained.
13.251/36=0.368 kWh is obtained.
B-3: In the sat'd solution, the concentration of feed is decreased to 15 g/L or less, so it is difficult to calculate.
Assuming that only a small amount, for example, 15 g/L or 30 g/L, of salt can be added in the end, and MPE is set to zero,
1.5%:11.56/36=0.321 kWh/m$^3$, and 3.0% s:23.74/36=0.659 kWh/m$^3$ are obtained, wherein m$^3$ is the volume of the solution.
Variable OE chamber depth=from the end (15 g, 15 g at 23%), OE output (30 g, 15 g)

2-3. M−Δπ=0 (Singularity) Reverse Osmosis; Comparison Between σ=1 and σ<1

Figure 4:
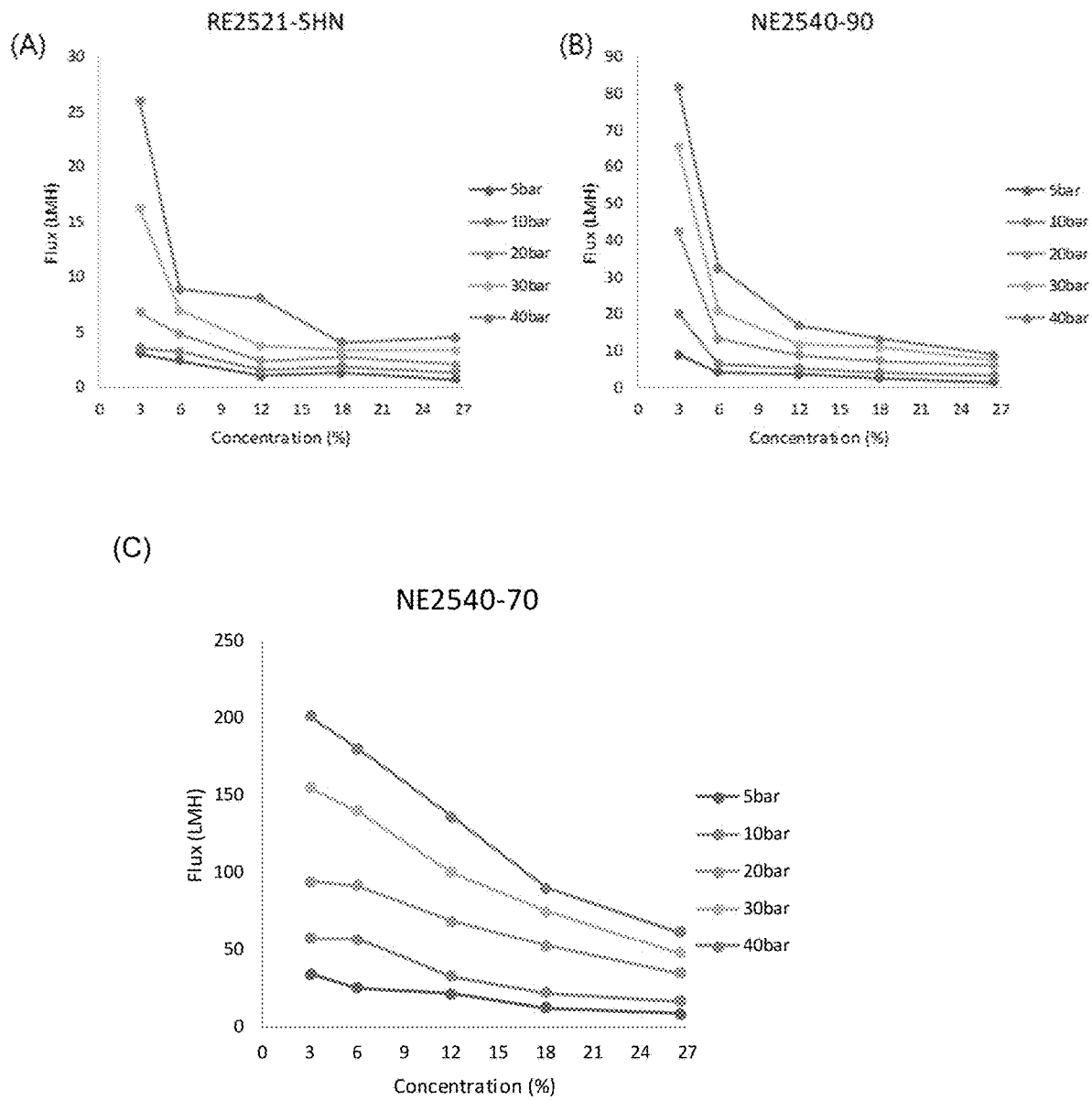
FIG. 4 shows the result of measurement of the filtration flux at a NaCl concentration from 3% to 26.47% according to a hydraulic pressure ΔP using the device of FIG. 3 using a commercial reverse osmosis membrane and a nanofiltration membrane, wherein FIG. 4 in graph (A) shows a RE2521-SHN membrane, in graph (B) shows a NE2540-90 membrane, and in graph (C) shows a NE2540-70 membrane.
Figure 5:
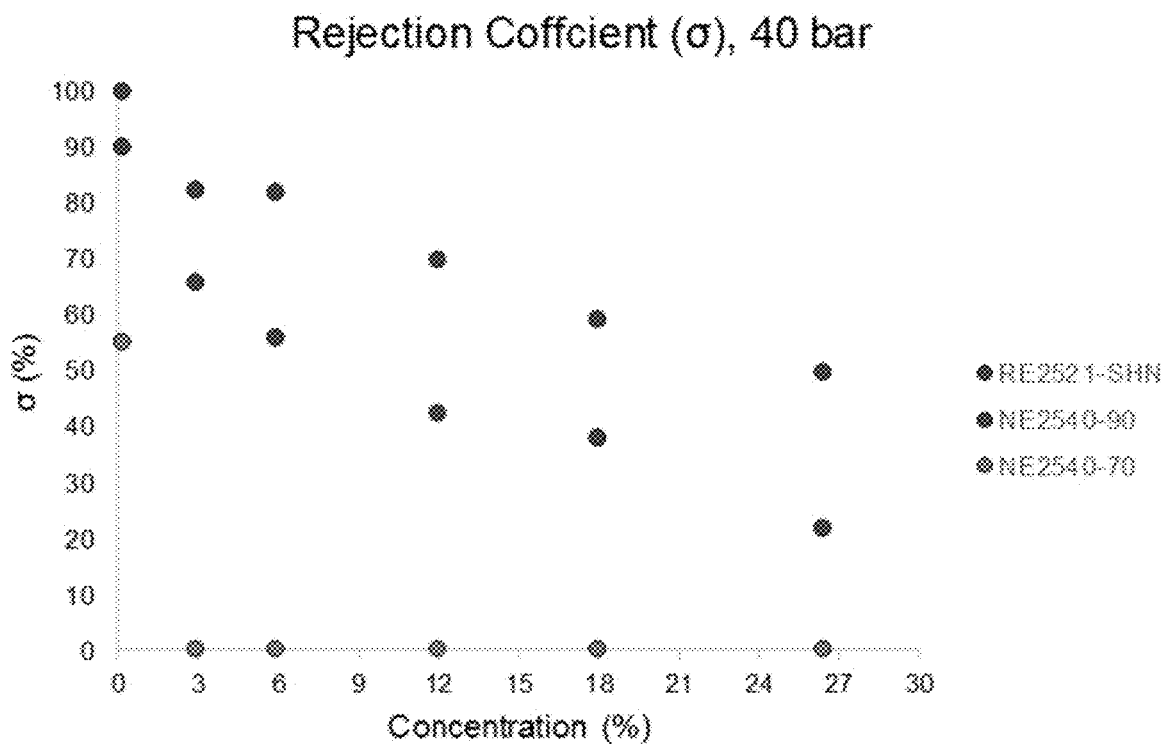
FIG. 5 shows the result of measurement of the selectivity of the membrane at 3%, 6%, 12%, 18% and 26.47% using the experimental device of FIG. 3, wherein the selectivity is determined by simultaneously measuring the weight and the concentration of the solution.

The following table shows the results of calculation using the selectivity of the membrane RE2521 according to the concentration of NaCl from the predicted values of the experimental devices (A) and (B) of FIG. 4. As shown in FIG. 5, the selectivity is a value measured at 40 bar, and corresponds to the top blue line, obtained using the predicted value at 70 bar, and in accordance with the equation y (selectivity)=2.40E−04 x$^2$+1.90366 x+9.7732E−01, a selectivity of 0.92 is obtained at 3%, and a selectivity of 0.6 is obtained at 26.47%.
The selectivity is obtained in accordance with the equation "selectivity=σ(40 bar)*70 bar/(70 bar+B)".
Reference (Marcel Mulder, Basic Principles of Membrane Technology, 2$^{nd}$ ed Kluwer Academic Press (1996).

TABLE 4

| | Salt(g) | Water (OE) | OE(3%) | | Singularity Reverse Osmosis | | Sat'd | Water-Rec | OE-Store | kWh/m3-sol'n | kWh/m3-W |
|---|---|---|---|---|---|---|---|---|---|---|---|
| Feed Chamber | 30 | 970 | 3.00% | 6.00% | 12.00% | 24.00% | 26.47% | | | | |
| RR = 100% | 30 | 970 | 3.00% | 6.00% | 12.00% | 24.00% | 26.47% | 0.00 | 3.00% | 0.659 | 0.680 |
| RR = 5/6 * 100% | 25 | 808.33 | 3.00% | 6.00% | 12.00% | 24.00% | 26.47% | 161.67 | 2.50% | 0.545 | 0.559 |
| RR = 4/6 * 100% | 20 | 646.67 | 3.00% | 6.00% | 12.00% | 24.00% | 26.47% | 323.33 | 2.00% | 0.431 | 0.440 |
| RR = 3/6 * 100% | 15 | 485.00 | 3.00% | 6.00% | 12.00% | 24.00% | 26.47% | 443.33 | 1.50% | 0.321 | 0.326 |
| RR = 2/6 * 100% | 10 | 323.33 | 3.00% | 6.00% | 12.00% | 24.00% | 26.47% | 646.67 | 1.00% | 0.211 | 0.213 |
| RR = 1/6 * 100% | 5 | 161.67 | 3.00% | 6.00% | 12.00% | 24.00% | 26.47% | 808.33 | 0.50% | 0.106 | 0.106 |
| RR = 10% | 3 | 97.00 | 3.00% | 6.00% | 12.00% | 24.00% | 26.47% | 873.00 | 0.30% | 0.063 | 0.064 |
| RR = 6/6 * 100% | 0 | 0.00 | 3.00% | 6.00% | 12.00% | 24.00% | 26.47% | 888.67 | | | |
| S-Δπ = 0 RO | 15 | 928.33 | 1.59% | 3.38% | 7.76% | 21.95% | 26.47% | | 1.59% | 1.716 | 1.937 |

Example 3: Comparison of RE 2521 (RO Membrane Standard) Theoretical Energy

The energy consumption was calculated from FIG. 6, Table 4, and Table 5, and the results are shown in Table 6 below.

M–Δπ=0 (Singularity) Reverse Osmosis; Comparison Between σ=1 and σ<1 (Table 6)

TABLE 5

| Basis: 3% solution (water) | | | | σ = 1 | | 3.50% | | | | 4.50% | | |
|---|---|---|---|---|---|---|---|---|---|---|---|---|
| | | 500 L | | 750 L | | 500 L | | 750 L | | 500 L | | |
| | RO | 0.950 | | 1.320 | | 0.975 | | 1.563 | | 1.586 | | |
| | Δπ = 0 RO | 0.950 | | 1.320 | | 0.95 | | 1.563 | | 1.586 | | |
| n = 10 | M–Δπ = 0 R | 0.659*1 | | | n = 10 | 0.778 | | | n = 10 | 1.013 | | |
| | OE-O | kwh/m3 | OE-O | kwh/m3 | OE-O | kwh/m3 | OE-O | kwh/m3 | OE-O | kwh/m3 | OE-O | kwh/m3 |
| n = 2.0 | 1.59% | 0.341 | 1.71% | 0.369 | 1.87% | 0.402 | 2.33% | 0.506 | 2.45% | 0.477 | 2.55% | 0.557 |
| n = 3.0 | 1.00% | 0.211 | 1.20% | 0.257 | 1.17% | 0.249 | 1.75% | 0.376 | 1.50% | 0.322 | 1.79% | 0.385 |
| n = 4.0 | 0.75% | 0.159 | 0.92% | 0.194 | 0.88% | 0.186 | 1.40% | 0.299 | 1.12% | 0.238 | 1.38% | 0.295 |
| n = 10 | 0.30% | 0.063 | 0.39% | 0.082 | 0.35% | 0.074 | 0.39% | 0.084 | 0.45% | 0.095 | 0.59% | 0.125 |
| n = 12 | 0.25% | 0.053 | 0.32% | 0.076 | 0.29% | 0.061 | 0.27% | 0.057 | 0.38% | 0.080 | 0.49% | 0.104 |
| Basis: 3% solution (water) | | | | σ < 1 | | 3.50% | | | | 4.50% | | |
| 2.00% | n = 2 | 0.431 | 1.71% | 0.368 | 2.33% | 0.507 | 1.99% | 0.429 | 2.97% | 0.649 | 2.55% | 0.554 |
| 1.50% | n = 3 | 0.321 | 1.20% | 0.255 | 1.75% | 0.371 | 1.40% | 0.299 | 2.23% | 0.484 | 1.79% | 0.482 |
| 1.20% | n = 4 | 0.255 | 0.92% | 0.195 | 1.40% | 0.299 | 1.08% | 0.229 | 1.79% | 0.385 | 1.35% | 0.288 |
| 0.545% | n = 10 | 0.115 | 0.39% | 0.142 | | | | | | | | |
| 0.469% | n = 12 | 0.1003 | | NA | | | | | | | | |
| Limit 100 pm | Final water quality | 2.39 | | 60 5.32 g | | 70 2.2 g | | 6.5 g | | 117 5.03 g | | 99.5 14.55 g |
| leaking salt | | | | | | | | | | | | |

It can be seen that the energy of the saturated solution was not obtained, and that the amount of M–Δπ=0 varies using 3.0%, 3.5%, and 4.5% seawater.

Calculation is possible at both σ=1 and σ<1, and in the case of σ<1, the limit for drinking water is 0.1 g/L=100 mg/L (100 Ppm), because the leaked salt restricts the application of large n. It was found that drinking water was inappropriate because the limit is 117.

The result of Table 5 is a reference for determining the degree of leakage. 500 L or 750 L of water is recovered and potable water can be obtained by applying simple Δπ=0 RO, if only post-treatment is performed well even at n=3 or 4 (low pressure RO). Additionally, in the case of 4.5%, it is possible to improve the water quality by reducing the residence time even though the recovery rate is slightly reduced in order to increase the selectivity of the membrane.

Table 6 below is a table showing various limit values in case of σ=1. Table 6 shows the theoretical energy required for water recovery and various values when the selectivity is 1.

TABLE 6

Theoretical Energies of Reverse Osmosis in kWh/m3-water recovery

M-Δπ = 0 RO (R&D of NRF 2017~2019) U.S./Korea patents, PCT (preparation)*

| start | end | Rec % | low (bar) | high (bar) | min-E(1) | min-E(σ) |
|---|---|---|---|---|---|---|
| 3.00% | 26.47% | 91.40% | 9.96 | 23.74 | 0.016 | |
| 3.50% | 26.47% | 89.93% | 16.59 | 27.94 | 0.019 | |
| 4.50% | 26.47% | 86.91% | 20.62 | 36.68 | 0.028 | |

1)Min-E(σ) decreases from 0.588 => 0.392 => 0.198 with the water recovery of 90%, 75%, 50%

| start | end | Rec % | low | high | KWh-sat | Energy/m³ |
|---|---|---|---|---|---|---|
| 1. Δπ = 0 RO: USP 09950297 (2018), Korea Patent, 10-1865342-0000(2018) | | | | | | |
| 3.00% | 26.47% | 91.40% | 13.09 | 23.74 | 1.717 | 1.937 |
| 3.50% | 26.47% | 89.93% | 15.3 | 27.94 | 1.872 | 2.156 |
| 4.50% | 26.47% | 86.91% | 22.28 | 36.68 | 2.275 | 2.741 |
| 2. Reverse Osmosis | | | | | | |
| 3.00% | 26.47% | 91.40% | 23.74 | 343.7 | 1.717 | 1.937 |
| 3.50% | 26.47% | 89.93% | 27.94 | 343.7 | 1.872 | 2.156 |
| 4.50% | 26.47% | 86.91% | 36.68 | 343.7 | 2.275 | 2.741 |

| start | end | Rec % | low | high | 50% | Energy/m³ |
|---|---|---|---|---|---|---|
| 3A: Δπ = 0 RO | | | | | | |
| 3.00% | 6.00% | 50.00% | 13.09 | 23.94 | 0.475 | 0.950 |
| 3.50% | 7.00% | 50.00% | 15.3 | 27.94 | 0.487 | 0.975 |
| 4.50% | 7.29% | 30.00% | 22.28 | 36.68 | 0.338 | 1.129 |
| 3B: Commercial Practice | | | 4 kWh/m³ | | | |
| 4 times * Energy(Theo)/m3 = 4 kWh/m3 | | | | | | |
| 3.00% | 6.00% | 50.00% | 23.94 | 50.46 | 0.475 | 0.950 |
| 3.50% | 7.00% | 50.00% | 28.01 | 60.11 | 0.487 | 0.975 |
| 4.50% | 7.29% | 30.00% | 36.48 | 63.01 | 0.338 | 1.129 |

Example 4: Feed Chamber to OE Chamber Permeation Rate According to Flow Rate of OE Chamber in Zero-Osmotic Pressure Difference State There are currently no modules for performing Δπ-0 RO, MΔπ-0 RO experiments, and it is difficult to manufacture such modules, but the experiments were performed in a salt solution having a relatively low flux concentration, as shown in FIG. 5. The device is similar to that shown in part (A) of FIG. 3, the 1-velocity of the pump is 2.45 ml/min, the 2-velocity thereof is 5.30 ml/min and the 3-velocity thereof is 8.37 ml/min. Qm (membrane flux) was added thereto, and the time taken to reach a certain weight was measured. As a result, the total velocity (Qm) could be determined.

That is, the total velocity is calculated using the equation Qxm−Qx=Qm. Dividing Qm by the residence time (θc) gives the flux relative to the angular velocity. This is the lowest velocity and can be compared with the relative transmission velocity.

In the simulation experiment of 3% M−Δπ=0 RO of calculation (Example) in FIG. 5, the relative transmission velocity (RM, relative magnitude) per unit time increases in the velocity order of 1.000 (X1), 2.251 (X2) and 5.756 (X3). In the case of permeation from the feed chamber to the OE chamber, the concentration of the OE chamber in Δπ=0 RO is inevitably reduced, Au increases, and the permeation decreases. In FIG. 4, the relative velocity is greater than 1 in all cases except for 2 of the 20 data, which demonstrates M−Δπ=0 RO.

As an example of calculation, the relative flux of membrane permeation according to the flow rate of the OE chamber in 3% Δπ=0 RO increases when the permeation per unit time increases at an increasing velocity for the same weight, as shown in Table 8 below.

TABLE 7

| | | | | |
|---|---|---|---|---|
| 3% Δπ = 0 RO | Q-mx | 3.59 | 6.681 | 10.595 |
| | Q-m | 1.14 | 1.381 | 2.225 |
| | Θc | 9.44 | 5.08 | 3.2 |
| | Q-m/Θc | 0.1208 | 0.2719 | 0.6953 |
| | RM | 1.000 | 2.251 | 5.758 |

It can be seen that RM (relative magnitude)=1.000 (X1), 2.245 (X2), 5.758 (X3).

In conclusion, it was found that a large amount of flux was obtained at 40 bar when the velocity was increased in experiments assuming zero osmotic pressure difference or actual feed-OE concentration, specifically, by 2.3 times (x3/x1) in Experiment 1, 3.6 times in Experiment 2, 1.8 times in Experiment 3, 5.7 times in Experiment 4, 6.8 times (zero osmotic pressure difference is not applied) in Experiment 6, 4 times in Experiment 8, 3 times in Experiment 9, 13 times in Experiment 10, and 9.6 times in Experiment 11 (FIG. 7).

Example 5: Experiments on Scale-Up (Membrane Area 0.1 m²) and M−Δπ=0 RO Module The module used in the experiments to date has a structure in which the feed solution in the feed chamber directly contacts the membrane, whereas the OE chamber includes a 5 mm thick stainless steel porous plate and a mm thick channel to withstand high pressure as outermost elements. To perform the experiment of the zero osmotic pressure difference, the same concentration is applied to the feed chamber and the OE chamber, but it is difficult to expect a large amount of flux because the zero osmotic pressure difference flux is determined when the membrane of the OE chamber is diluted with water input to the RO.

In the present module scale-up experiment, the membrane area was increased from 53 cm$^2$ to 1,000 cm$^2$ (0.1 m$^2$), that is, by 19 times, and a thick steel plate was used as the exterior material to withstand high pressure (part (A) of FIG. 11. In addition, 4 sheets of nonwoven fabrics were disposed in the OE chamber such that the volume of the feed chamber was three times the volume of the OE chamber, and 12 sheets of nonwoven fabrics were disposed in the feed chamber such that the solution flows in the OE chamber at a velocity of 3 times that of the feed chamber. However, since the maximum pressure could not be raised above 25 atm, the experiment was performed at 40 bar in the case of 53 cm$^2$, but the M-Δπ-0 RO experiment was performed at 20 bar. The results were compared.

Data for the comparison, including concentration, pressure, and flux values, for the module with membrane area of 0.005278 m$^2$ and for the scale-up module with membrane area of 0.1 m$^2$, are shown in FIG. 12.

The result of a comparison with the case of 53 cm$^2$ is shown in part (B) of FIG. 11. The result showed that M-Δπ-0 at 0.1 m$^2$ yields much higher flux despite the low pressure because neither the complete zero osmotic pressure difference nor the M-Δπ-0 RO effect occur in the module having a small area.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

ACKNOWLEDGEMENT

This work was supported by the Ministry of Science and ICT through the National Research Foundation (NRF) of Korea (NRF-2017R1A2B2008625 and NRF-2019R1H1A2079989).

INDUSTRIAL APPLICABILITY

The method of concentrating an aqueous solution at a hydraulic pressure in a zero osmotic pressure difference condition according to the present invention advantageously consumes little energy, is capable of concentrating the solution until the maximum saturated aqueous solution concentration of the solute is obtained or the concentration of the solute reaches 100% without using an extraction solvent, does not need to use a separate osmotic pressure draw agent, and enables operation with notably lower energy than the previous inventions.

The invention claimed is:

1. A method of concentrating a solute-containing solution under a Δπ reduction condition in a feed output split counter-current (FOS-CC) manner, comprising using a zero osmotic pressure difference concentrator including a multiple zero osmotic pressure difference chamber and an external reservoir (ER), wherein the multiple zero osmotic pressure difference chamber comprises a feed chamber, an osmotic equalizer chamber (OE chamber), and an osmotic membrane disposed between the feed chamber and the osmotic equalizer chamber, and a ratio of a velocity of the osmotic equalizer chamber (OE-vel) to a velocity of the feed chamber (F-vel) satisfies Equation 1 below;

$$F\text{-}vel/OE\text{-}vel = 1/n \qquad \text{Equation 1:}$$

wherein a part (Q1) of a concentrated solution is output from the multiple zero osmotic pressure difference chamber, and another part (Q2) thereof is recycled in a counter-current direction to the feed to the osmotic equalizer chamber of the multiple zero osmotic pressure difference chamber, wherein a velocity of the recycling (OE-Vel) is higher than a velocity of the output (F-Vel), wherein n is a real number from 2 to 40, a sum of Q1 and Q2 is equal to a total weight of the solution concentrated in the multiple zero osmotic pressure difference chamber, F-vel is an output velocity of Q1, and OE-vel is a recycle velocity of Q2, wherein using the zero osmotic pressure difference concentrator comprises:

(i) transferring the solute-containing aqueous solution to the feed chamber of the zero osmotic pressure difference chamber, feeding a solution having the same osmotic pressure as the aqueous solution transferred to the feed chamber to the osmotic equalizer chamber to form a zero osmotic pressure state between the feed chamber and the osmotic equalizer chamber; and (ii) transferring water from the aqueous solution to the osmotic equalizer chamber by applying a pressure of 10 to 100 atm to the feed chamber through the osmotic membrane in the zero osmotic pressure state to concentrate the aqueous solution, and wherein the external reservoir stores the solution output from the osmotic equalizer chamber in the counter-current direction.

2. The method according to claim 1, wherein the zero osmotic pressure difference concentrator further comprises a reverse osmosis chamber that functions to recover the concentrated solution or the solute.

3. The method according to claim 1, wherein energy consumption decreases as the concentration of the concentrated solution in the multiple zero osmotic pressure difference chamber decreases.

4. The method according to claim 1, wherein a ratio of the volume of the osmotic equalizer chamber (Voe) to the volume of the feed chamber (Vf) satisfies the following Equation 2, and the volume of the osmotic equalizer chamber (Voe) and the volume of the feed chamber (Vf) are calculated using the following Equations 3 and 4, respectively:

$$Voe/Vf = 1/n \qquad \text{Equation 2:}$$

$$Voe = A*OE\text{-}h \qquad \text{Equation 3:}$$

$$Vf = A*F\text{-}h \qquad \text{Equation 4:}$$

wherein A is an area of the osmotic membrane shared by the feed chamber and the osmotic equalizer chamber, OE-h is a height of the osmotic equalizer chamber, and F-h is a height of the feed chamber, wherein n is a real number from 2 to 40.

5. The method according to claim 1, further comprising passing an output of the osmotic equalizer chamber of the zero osmotic pressure difference concentrator as a feed stream through a second zero osmotic pressure difference concentrator to increase concentration efficiency.

6. The method according to claim 1, further comprising recovering a solidified solute from the concentrated solution using thermal energy, electrical energy, or pressure.

7. A method of separating a solvent and a solute from a solute-containing aqueous solution using the method according to claim 1.

8. The method according to claim 7, wherein the solute is a salt or a liquid, and the solvent is water.

* * * * *

UNITED STATES PATENT AND TRADEMARK OFFICE
CERTIFICATE OF CORRECTION

PATENT NO. : 12,221,365 B2  Page 1 of 1
APPLICATION NO. : 17/438060
DATED : February 11, 2025
INVENTOR(S) : Ho Nam Chang et al.

It is certified that error appears in the above-identified patent and that said Letters Patent is hereby corrected as shown below:

In the Specification

Column 3, Line 19, "n-equalizer" should be -- $\pi$-equalizer --.

Column 3, Line 24, "n-equalizer" should be -- $\pi$-equalizer --.

Column 5, Line 47, "S-$\Delta\pi$-0 RO and M-$\Delta\pi$-0 RO" should be -- S-$\Delta\pi$=0 RO and M-$\Delta\pi$=0 RO --.

Column 8, Line 65, "(300, 500, 75%)" should be -- (30%, 50%, 75%) --.

Column 11, Lines 26-27, "15S/(15A+97*0.5W)=3%" should be -- 15S/(15S+97*0.5W)=3% --.

Column 17, Lines 40-41, "$\Delta\pi$-0 RO, M$\Delta\pi$-0 RO" should be -- $\Delta\pi$=0 RO, M$\Delta\pi$=0 RO --.

Column 17, Line 62, "Au" should be -- $\Delta\pi$ --.

Column 18, Line 67, "a mm thick" should be -- a 5 mm thick --.

Column 19, Line 27, "M-$\Delta\pi$-0" should be -- M-$\Delta\pi$=0 --.

Column 19, Line 30, "M-$\Delta\pi$-0" should be -- M-$\Delta\pi$=0 --.

Signed and Sealed this
Second Day of December, 2025

John A. Squires
*Director of the United States Patent and Trademark Office*